US005764463A

United States Patent [19]

Arvidson et al.

[11] Patent Number: 5,764,463

[45] Date of Patent: Jun. 9, 1998

[54] CURRENT LIMITING CIRCUIT AND ELECTRONIC FUSE FOR USE IN FOAM INJECTION FIRE FIGHTING SYSTEMS

[75] Inventors: Lawrence C. Arvidson, New Brighton; Robert S. Horeck, Fridley, both of Minn.

[73] Assignee: Hypro Corporation, St. Paul, Minn.

[21] Appl. No.: 708,251

[22] Filed: Sep. 6, 1996

[51] Int. Cl.[6] .......... H02H 5/04

[52] U.S. Cl. .......... 361/31; 361/23

[58] Field of Search .......... 361/18, 22, 23, 361/24, 28, 29, 30, 31, 78, 87, 93, 94–98, 100, 101, 102

[56] References Cited

U.S. PATENT DOCUMENTS

| | | | |
|---|---|---|---|
| 4,324,294 | 4/1982 | McLoughlin et al. | 169/13 |
| 4,969,076 | 11/1990 | Schutten et al. | 363/17 |
| 5,187,653 | 2/1993 | Lorenz | 361/91 |
| 5,222,009 | 6/1993 | Scharnick et al. | 361/28 |
| 5,232,052 | 8/1993 | Arvidson et al. | 169/14 |
| 5,483,136 | 1/1996 | Marcinkiewicz | 363/47 |

*Primary Examiner*—Ronald W. Leja

*Attorney, Agent, or Firm*—Haugen and Nikolai, P.A.

[57] ABSTRACT

A fire extinguishing system in which a calculated quantity of a liquid chemical foamant is introduced into the main water stream being directed at a fire equipped with a protective circuit for limiting the amount of average current flowing within a motor driving a fluid pump used to inject the chemical foamant, in addition to an electronic fuse circuit for automatically shutting off the power being supplied to the low-level electronics.

9 Claims, 7 Drawing Sheets

CURRENT LIMITING CIRCUIT AND ELECTRONIC FUSE FOR USE IN FOAM INJECTION FIRE FIGHTING SYSTEMS

BACKGROUND OF THE INVENTION

1. Field of the Invention

This invention relates generally to a fire extinguishing system in which a calculated quantity of a liquid chemical foamant is introduced into the main water stream being directed at a fire. More particularly, the present invention relates to a protective circuit for limiting the amount of average current flowing within a motor driving a fluid pump used to inject the chemical foamant, in addition to an electronic fuse circuit for automatically shutting off the power being supplied to the low-level electronics.

2. Discussion of the Prior Art

One of the most significant advancements in the field of fire fighting has come through the use of chemical foamants specifically formulated to augment the fire fighting ability of water. Generally speaking, this is accomplished via foam injection systems designed to introduce chemical foamant into the water stream being directed at a fire. Two types of foams are commonly used in fire-fighting applications. Class A foam is used for Class A fuels, including most solid combustible materials such as grass, wood, fabric, etc. Class B foam is effective in fighting fires involving Class B fuels, including combustible liquids such as gasoline, oil, etc. A key advantage to using such foams is the dramatic reduction in the time required to extinguish fires. Type A foam accomplishes this by providing enhanced wetting properties, wherein the water is allowed to spread and penetrate the Class A fuels more readily, and enhanced surfactant properties, wherein the water forms bubbles which cling to Class A fuels such that the water is more capable of absorbing the heat from the burning of the Class A fuel than it would be if the water was allowed to simply run off the burning structure. Type B foams reduce the time required to extinguish Class B fires by allowing the water to float on the flammable liquids so as to extinguish the fire primarily by smothering. Reducing the amount of time required to extinguish fires advantageously minimizes the likelihood of injury, heat stress, smoke inhalation, and/or physical stress to the fire fighters, in addition to drastically reducing the amount of smoke and water damage to the structure.

Although most fire fighting situations call for the use of Type A foam, many instances exist when fire fighters need both Type A foam and Type B foam to combat a fire involving both solid combustible material and flammable liquids. This is especially true considering the proliferated shift in population from urban to rural-style living, wherein fire fighters are required to use both types of foams to effectively and efficiently respond to fires having both Class A and Class B fuels. To meet this challenge, various foam introduction systems have been arranged on fire-fighting vehicles for selectively introducing Class A foam and Class B foam into the main water stream being directed at the fire so as to allow fire fighters to respond to both Class A fires and Class B fires, respectively.

Notwithstanding these efforts undertaken to advance the state of the art in foam-injection fire fighting systems, there are several distinct drawbacks with the foam injection systems of the prior art that are common to both single foam capability and dual foam capability and which precipitate the need for the present invention. The first of these problems relates generally to the motor driver circuitry which is employed to proportion the liquid chemical foamant into the water stream being directed at the fire. To be more specific, various situations exist where overcurrent conditions are experienced in the high power devices within the control circuitry. For example, certain occasions exist when the hose used to deliver the foam and water solution must be elevated high above the fire-fighting vehicle in order to reach the particular fire. When this occurs, a piezometric pressure head developes within the hose member such that is becomes increasingly difficult for the motor driving circuitry to drive the motor used to operate the foam pump. The current being drawn by the motor during these situations may heighten to the point that the motor is incapable of driving the foam pump at a speed sufficient to introduce foam into the water stream. The motor will then stall out and current will be subjected therethrough in amounts which can permanently damage and/or ruin the motors. The prior art foam injection systems offer no effective solution to overcome such overcurrent situations.

The other main drawback relates to the low power circuitry used to operate the various electronic components used in the prior art foam-injection systems. More particularly, a problem exists in that the prior art foam injection systems typically only offer thermal circuit breakers to protect against overcurrent conditions within the low power circuitry. The use of thermal circuit breakers is disadvantageous in that, once tripped, the thermal breakers remains in a slightly heated state such that it will trip at lesser and lesser current levels as time passes. The excessive heat experienced during fire fighting activities also prompts the thermal breakers to trip too easilty, thereby undesireably halting the foam injection activities.

Based upon the foregoing, it can be seen that a need exists for a protective circuit for limiting the amount of average current flowing within a motor driving a fluid pump used to inject the chemical foamant. A need also exists for an electronic fuse circuit for automatically shutting off the power being supplied to the low-level electronics so as to avoid the need for thermal circuit breakers.

OBJECTS AND SUMMARY OF THE INVENTION

It is accordingly a principal object of the present invention to provide a protective circuit for use within foam proportioning fire-fighting equipment which limits the amount of average current flowing within a motor driving a fluid pump used to inject the chemical foamant.

Another object of the invention is to provide an electronic fuse circuit for automatically shutting off the power being supplied to the low-level electronics in the case of an overcurrent condition so as to avoid the need for thermal circuit breakers.

In a broad aspect of the present invention, a fire extinguishing system is provided of the type including water supply means for normally delivering water at varying flow rates through a hose member, and means for monitoring water flow through the hose member and producing an electrical signal related to a characteristic of the water flowing through said hose member. A supply tank is provided for containing a supply of a liquid chemical foamant. Pump means are provided having an input port coupled to the supply tank and an output port coupled to the hose member. Sensing means are provided for sensing a parameter corresponding to one of a speed at which the pump means is being driven and a flow of liquid chemical foamant being pumped from the pump means and generating a corresponding output signal. Computing means are coupled to receive the electrical signal and the output signal from the sensing means. The computing means is capable of determining a speed at which a variable speed electrical drive motor connected to the positive displacement pump should be driven to introduce a metered quantity of the liquid chemical foamant into the hose member and for generating a corresponding control signal. The improvement to the above fire extinguishing system comprisescurrent limiting means coupled to the computing means and the drive motor. The current limiting means is provided for setting an average current threshold indicative of a maximum average current that can flow within the drive motor, detecting when an average current flow within the drive motor exceeds the average current threshold, and automatically removing a motor supply current being supplied to the drive motor when the average current exceeds the average current threshold such that the average current is maintained at the average current threshold.

In accordance with another broad aspect of the present invention, a method of protecting the circuitry within a foam-injection fire fighting system is provided, wherein the circuitry includes low power devices and high power devices, comprising the steps of: (a) automatically limiting an average current flow within the high power devices so that the average current flow does not exceed a predetermined average current threshold; and (b) automatically limiting a current flow within the low power devices so that the current flow does not exceed a predetermined current threshold.

DESCRIPTION OF THE DRAWINGS

The foregoing objects, features and advantages of the invention will become apparent to those skilled in the art from the following detailed description of a preferred embodiment, especially when considered in conjunction with the accompanying drawings in which like numerals in the several views refer to corresponding parts.

DESCRIPTION OF THE PREFERRED EMBODIMENT

Figure 1:
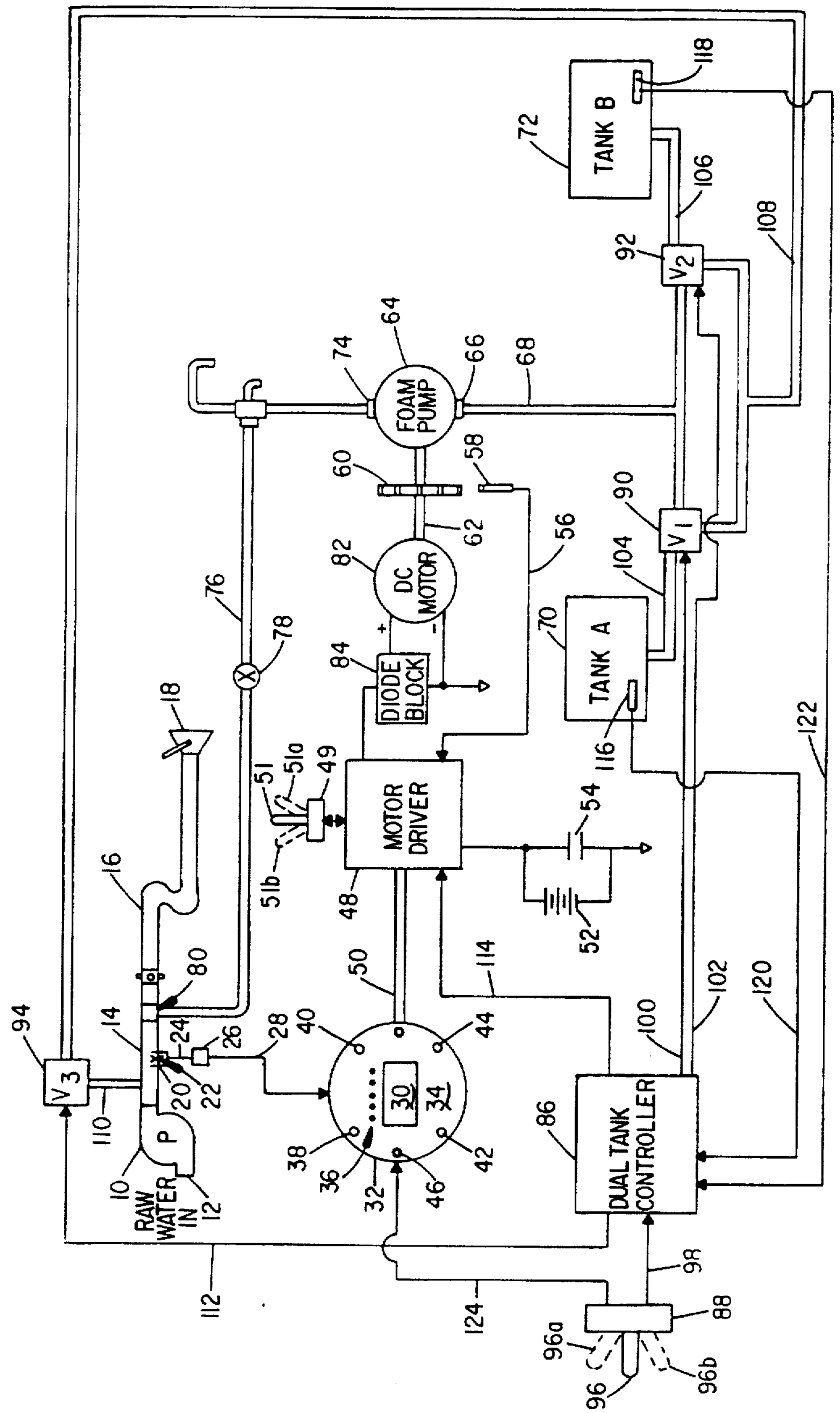
FIG. 1 is a schematic diagram of a fire extinguishing system incorporating an electronic fuse circuit and current limiting circuit within the motor driver module 48 in accordance with the present invention.

Referring initially to FIG. 1, the electronic fuse circuit and current limiting circuit of the present invention are illustrated in use with a foam introduction fire-fighting system of the type disclosed in U.S. Pat. No. 5,232,052 and Reissue Application Ser. No. 08\444,226 assigned to the applicants' assignee, the teachings of which are incorporated herein by reference. The fire-fighting system includes a conventional water pump 10 normally found on existing fire trucks. Water pump 10 has an inlet 12 connected to a raw water supply (not shown) and delivers water under pressure through a manifold 14 and a hose 16 having a variable flow nozzle 18 at its discharge end. A fitting 20 is provided along the length of manifold 14 which contains a flow meter 22 or equivalent device for measuring a characteristic of the water flowing in hose 16 and delivering electrical signals over conductor 24 to a pulse forming circuit 26. The rate at which the pulse forming circuit 26 outputs pulses on a conductor 28 is indicative of the volume rate of flow of water through the manifold 14.

The pulsed signal from pulse forming circuit 26 is applied to a microprocessor-based controller contained within a computer and display module 32, only the face plate 34 of which can be seen in the view of FIG. 1. Face plate 34 includes a display panel 30 which may typically comprise a five digit, 7-segment display of conventional design. A plurality of discrete LED's 36 are associated with each of a series of words stenciled on the face plate 34 so as to provide visual communication to an operator. A series of manually actuable push-buttons 38, 40, 42 and 44 are also provided on the face plate 34. Push-button 38 is labeled on/off and is used to determine whether foam concentrate is to be injected into the water stream or not. Push-button 40 causes a number of different functions to be displayed on the five-digit display screen 30. Push-button 42 is a down arrow key which, when depressed, functions to decrease the value of the quantity being displayed on the display screen 30. In similar fashion, push-button 44 is an up arrow key used to increase the quantity being presented on the display screen 30. A push-button 46 is hidden from view behind a removable screw and is used to place the system in a setup or calibrate mode.

The circuitry in the computer and display module 32 includes a block of ROM memory for operating an executable program for proportioning a selected liquid chemical foamant into the main water stream at a predetermined concentration and a block of non-volatile RAM for storing a plurality of calibration factors specific to each type of foamant used within the system. Calibration is performed for each particular type of chemical foamant under the protocol set forth in U.S. Pat. No. 5,232,052 and Reissue Application No. 08/444,226, assigned to the applicant's assignee and will therefore not be repeated. The calibration parameters for each chemical foamant are stored in non-volatile RAM memory within the microprocessor of the computer and display module 32 such that each set of calibration factors will not be lost in the event of system shut-off or power failure.

The computer and display module 32 is connected to a motor driver module 48 via a five conductor cable 50. In addition to the control received from the computer and display module 48 via cable 50, the motor driver 48 also receives pulses on line 56 coming from a magnetic pickup 58 associated with a notched wheel 60 coupled to the drive shaft 62 of a positive displacement pump 64, in addition to a float status signal on line 114 coming from a microprocessor-based dual tank controller 86. Although not shown, it is possible to replace the pump speed feedback signal generated by the notched wheel 60 and pickup 58 with a feedback signal from a flow meter 22 or equivalent device positioned so as to measure a characteristic of the foam-injected water flowing from the outlet 74 of the pump 64 for the purpose of determining the rate at which the motor 82 should be operated at to proportion chemical foamant into the water stream at an appropriate concentration. The positive displacement pump 64 has an inlet 66 connected by a hose member 68 to first valve means 90 and second valve means 92, and an outlet 74 coupled by a hose 76 and a check valve 78 to an injector 80. The drive shaft 62 of the pump 64 is arranged to be driven by a DC motor 82 which receives its energization from the motor driver module 48 via a diode block 84. The speed of the electrical drive motor 82 is controlled using a pulse width modulated drive signal transmitted from the computer and display module 32 to the motor driver 48 via conductor 50.

The fire-fighting system may be energized by a battery supply 52 having a storage capacitor 54 connected in parallel therewith. A double pole double throw switch 49 having a toggle member 51 is associated with the motor driver module 48 for turning the foam introduction system on (51*a*) and off (51*b*). Placing the toggle member 51 at 51*b* also serves to reset an electronic fuse circuit (not shown) disposed within the motor driver module 48 in the instance that an overcurrent condition is experienced within any of the low power circuitry of the system. Also disposed within the motor driver module 48 is a current limiting circuit (not shown) designed to protect the high power circuitry from overcurrent conditions.

A first foam tank 70 is provided having a supply of a first liquid chemical foamant disposed therein, as is a second foam tank 72 having a supply of a second liquid chemical foamant disposed therein. For purposes of the following discussion, it will be assumed that the first liquid chemical foamant is actually Type A liquid foam concentrate, and that the second liquid chemical foamant is Type B liquid foam concentrate. However, it is to be readily understood that the first and second foam tanks 70, 72 may be filled with any number of different chemical foamants without departing from the scope of the present invention. The first foam tank 70 is coupled to the first valve means 90 via a hose 104, while the second foam tank 72 is connected to the second valve means 92 via a hose member 106. Also connected to the first valve means 90 and the second valve means 92 is a hose member 108 coupled to a third valve means 94. The third valve means 94 is further coupled to the manifold 14 by a conduit 110.

The dual tank controller 86 receives inputs from a first level sensor 116 within the first supply tank 70 via a conductor 120, a second level sensor 118 within the second supply tank 72 via conductor 122, and a tank selector switch 88 via line 98. The signals being transmitted to the dual tank controller 86 on lines 120 and 122 are status signals which change state when the foamant within the first supply tank 70 and the second supply tank 72, respectively, drop below a predetermined level. The dual tank controller 86 transmits the float status signal to the motor driver module 48 for the selected supply tank. This float status signal is rerouted from the motor driver module 48 to the computer and display module 32 via conductor 50. In the event that the level sensor for the selected tank drops below the predetermined threshold, the computer and display module 32 will communicate a warning signal on the display 30 to apprise the fire-fighters of the low foamant condition. The computer and display module 32 is programmed to flash the warning signal "Low Concentrate" on the display 30 for a predetermined period of time (typically 2 minutes) such that the fire-fighters know how much time they have before the foamant being pumped will run out. With this information, the fire-fighters may then add more foamant within the subject supply tank so as to avoid having the motor driver module 48 automatically shut down the motor 82.

The signal being received by the dual tank controller 86 on line 98 is a switch status signal generated by the tank selector switch 88. In addition to being transmitted to the dual tank controller 86 via line 98, the switch status signal is also transmitted to the computer and display module 32 via a conductor 124. This switch status signal is generated by the tank selector switch 88 through the use of a toggle member 96 capable of being switched from a first position at 96*a* to a second position at 96*b*. With the toggle member at 96*a*, the switch status signal generated by the tank selector switch 88 will be in a first state. Conversely, the switch status signal will be in a second state when the toggle member 96 is positioned at 96*b*. For purposes of the following discussion, the switch status signal in the first state represents a choice by an operator to introduce the Type A liquid chemical foamant disposed within the first supply tank 70 into the hose member 16, while the switch status signal in the second state represents a choice by an operator to introduce the Type B liquid chemical foamant disposed within the second supply tank 72 into the hose member 16. The selector switch 88 will preferably be disposed within the cab of the fire truck so as to allow an operator to quickly and easily maneuver the toggle member 96 into the appropriate position (96*a* or 96*b*) depending upon which liquid chemical foamant is required for the particular fire-fighting situation.

In addition to being connected to the motor driver module 48 via conductor 114, the dual tank controller 86 has an output line 100 extending to first valve means 90, an output line 102 extending to second valve means 92, and an output line 112 extending to third valve means 94. In a preferred embodiment, the first, second, and third valve means 90, 92, 94 are solenoid valves configured so as to open when energized and to remain closed when not energized. To be more specific, the first valve means 90 is a three-way valve which, when non-energized, establishes a first line of fluid communication extending between hose members 68 and 108. As will be discussed in greater detail below, this first line of fluid communication is provided to facilitate the automatic flushing feature of the present invention. When the first valve means 90 is energized, a second line of fluid communication is established between hoses 68 and 104 such that the liquid chemical foamant disposed within the first supply tank 70 may be withdrawn therefrom and introduced into the manifold 14 by virtue of the pumping action of the pump 64. The second valve means 92 is also a three-way solenoid valve which similarly establishes a first line of fluid communication between hose members 68 and 108 when the coil within the second valve means 92 is non-energized and a second line of fluid communication extending between hose members 106 and 68 when the second valve means 92 is energized. The third valve means 94 is a two-way solenoid valve which only establishes a single line of fluid communication extending between hoses 108 and 110 when the coil within the third valve means 94 is energized.

Figure 2:
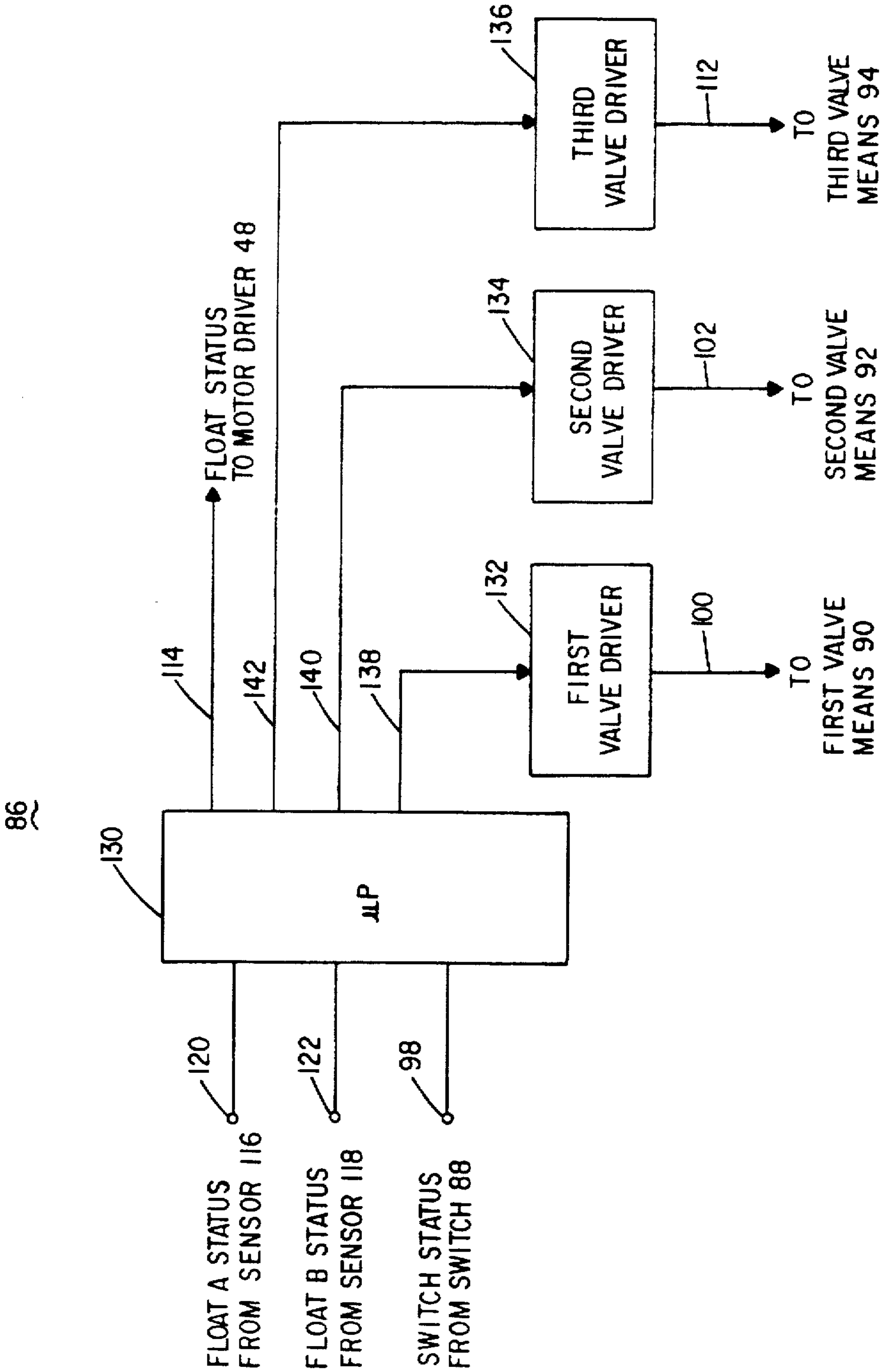
FIG. 2 shows a block diagram of the microprocessor and associated valve drivers forming a part of the dual tank control system of FIG. 1.

With collective reference to FIGS. 1 and 2, a microprocessor 130 provided within the dual tank controller 86 is programmed to control the operation of the first, second, and third valve means 90, 92, 94 based upon the switch status signal received on line 98. To be more specific, the microprocessor 130 transmits a single driver activation signal to one of a first valve driver 132, a second valve driver 134, and a third valve driver 136 provided within the dual tank controller 86 depending upon the switch status signal. When this driver activation signal is received at one of the first, second, and third valve drivers 132, 134, 136, the selected valve driver will, in turn, generate a valve control signal which is transmitted to the appropriate valve means via lines 100, 102, or 112.

The microprocessor 130 is programmed to direct the driver activation signal to the third valve driver 136 for a predetermined period of time to perform an automatic flushing sequence whenever a change in state is detected on the switch status signal and whenever the system is initially turned on. In either event, the third valve driver 136 will transmit the valve control signal to the third valve means 94 via a conductor 112 for the predetermined period of time. As noted above, this energization scenario establishes a line of fluid communication between hose members 108 and 110 and maintains the first and second valve means 90, 92 unenergized and therefore closed. Although unenergized and closed during the energization of the third valve means 94, the first and second valve means 90, 92 always have a line of fluid communication extending between hose members 108 and 68 such that the pump 64 will effectively draw water from the manifold 14 and route it through the hose member 68, the pump 64, and the hose member 76 before forcing the water back into the manifold 14 via the injector 80.

Through this automatic flushing sequence, the dual tank controller 86 directs the valve control signal to the third valve means 94 so as to effectively remove any chemical foamant out of the foam injection line which includes the hose member 68, the positive displacement pump 64, the hose member 76, the check valve 78, the injector 80, the manifold 14, the hose member 16, and the nozzle 18. The primary reason for undertaking this flushing is to eliminate or minimize the possibility that the different types of liquid chemical foamants will commingle within the injection line which, as noted above, can result in coagulation that clogs or restricts the flow within the injection line.

Following the completion of the foregoing automatic flushing sequence, the microprocessor 130 analyzes the switch status signal from the tank selector switch 88 to determine whether to pump chemical foamant from the first supply tank 70 or the second supply tank 72. If the microprocessor 130 determines that the switch status signal is in the first state, the driver activation signal will be directed to the first valve driver 132 on line 138 so as to pump the Type A foam from within the first supply tank 70. The first valve driver 132, upon receiving the driver activation signal from the microprocessor 130, will generate the valve control signal which is transmitted to the first valve means 90 via line 100. The energization of the first valve means 90 with the valve control signal establishes fluid communication between hose members 104 and 68 such that the Type A chemical foamant within the first supply tank 70 may be introduced into the manifold via the positive displacement pump 64. Although fluid communication also exists between hose members 68 and 108, as well as between hose members 108 and 68, it is to be noted with particularity that only the liquid chemical foamant within the first supply tank 70 will flow through hose member 68 because third valve means 94 is non-energized and closed such that no water can flow through first and second valve means 90, 92.

The microprocessor 130 will allow the chemical foamant within the first supply tank 70 to be pumped in this fashion until a change in status is detected on the switch status line. If a change in switch state is not detected, the Type A foamant will be continuously introduced into the water stream within the manifold 14 until the foam level within the first supply tank 70 drops below the predetermined level as indicated by the low level sensor 116. In this instance, the microprocessor within the computer and display module 32 will detect the change in the float status signal and thereby cause a "Low Concentrate-A" warning to flash upon the display 30 to apprise the operator that the particular foamant will run out within the predetermined period of time (2 minutes). The microprocessor within the computer and display module 32 receives the float status signal for the first supply 70 because the microprocessor 130 transmits the float status signal for the selected tank (Float A Status) to the motor driver 48 via line 114 which, in turn, re-routes this float status signal to the computer and display module 32. If additional Type A foamant is not administered into the first supply tank 70 by the completion of this predetermined period, then the motor driver module 48 will turn off the electric motor 82 so as to stop driving the positive displacement pump 64.

The corollary is true when the microprocessor 130 determines that the switch status signal is in the second state following the completion of the automatic flushing sequence. When this occurs, the microprocessor 130 directs the driver activation signal to the second valve driver 134 so as to cause the second valve driver 134 to transmit the valve control signal to the second valve means 92 on line 102. With the second valve means 92 energized with the valve control signal, fluid communication is established between hose members 68 and 106 such that the chemical foamant within the second supply tank 72 may be introduced into the manifold 14 via the pumping action of the positive displacement pump 64. Once again, water will not be drawn through hose 68 during the energization of the second valve means 92 due to the fact that the third valve means 94 remains unenergized and closed.

As with the first valve means 90, the microprocessor 130 maintains the second valve means 92 in this energized and open state until the microprocessor 130 detects that the switch status signal changes from the second state to the first state. If the this change in state is detected, the microprocessor 130 thereafter immediately initiates the automatic flushing sequence for the predetermined period of time, which is typically set for 8 seconds. If a change of state is not detected on the switch status line, the microprocessor 130 permits the second valve means 92 to remain open to continually pump the Class B foamant until the level drops below the predetermined level as indicated by the sensor 118. Once again, the float status signal for the second supply tank 72 (Float B status) is continuously transmitted to the motor driver 48 via line 114 which, in turn, re-routes this float status signal to the computer and display module 32. The microprocessor within the computer and display module 32 is programmed to detect this change the float status signal and flash a "Low Concentrate-B" warning on the display 30 so as to apprise the fire-fighters that the Class B foamant within the second supply tank 72 will run out within the predetermined period of time, which is usually set at 2 minutes. If additional Type B foamant is not administered into the second supply tank 72 within this predetermined period, the motor driver module 48 will shut off the electric motor 82 so as to stop driving the pump 64.

During each of the above-identified foam-introduction scenarios, the calibration factors for the particular foamant being pumped will be introduced into the executable proportioning program within the ROM memory of the computer and display module 32 through the use of the switch status signal being supplied to the computer and display module 32 via line 124. In so doing, the proportioning software will ensure that the selected foamant will be introduced into the water stream in a predetermined concentration as selected by an operator. For example, it is typically desired to proportion Class A foam into the water stream being directed at a Class B fire at a concentration of approximately 0.5%, whereas it is typical to proportion Class B into the water stream being directed at a Class B fire at a concentration of approximately 3%. Following the calibration protocol set forth in U.S. Pat. No. 5,232,052 and U.S. Reissue Application No. 08\444,226, an operator may calibrate the proportioning system while pumping Class A foam and Class B foam and store each specific set of calibration factors in the non-volatile RAM memory of the microprocessor within the computer and display module 32.

For further explain, once the status of the selector switch 88 is determined by the microprocessor within the computer and display module 32, the appropriate calibration factors are introduced into the proportioning program within the ROM memory. The microprocessor 130 of the dual tank controller 86 then directs the single driver activation signal to one of the first and second valve drivers 132, 134 depending upon the particular state of the switch status signal. This, as explained above, will cause the particular valve driver to energize the selected one of the first and second valve means 90, 92 to introduce the appropriate chemical foamant into the water stream. Depending upon the predetermined concentration level programmed into the computer and display module 32 by the operator, the computer and display module 32 directs an appropriate pulse width modulated signal to the motor driver module 48 so that the electric drive motor 82 may drive the pump 64 at a rate sufficient to introduce the selected chemical foamant into the water stream to achieve the predetermined concentration.

As such, the tank selector switch 88 causes the microprocessor within the computer to automatically retrieve the appropriate calibration factors for the selected chemical foamant such that the computer and display module 32 maintains an accurate account of how much of the selected foamant is being introduced into the water stream. This information is communicated to the operator by virtue of the display 30. An operator knowing how much foamant was originally in the selected tank can then calculate the amount of foamant remaining within the tank and summons for the delivery of additional foamant in the instance that the operator believes the remaining foam supply is inadequate to extinguish the particular fire. The microprocessor within the computer and display module 32 also stores the total amount of each chemical foamant that was pumped during a particular fire-fighting endeavor such that these values may be later recalled.

Figure 3:
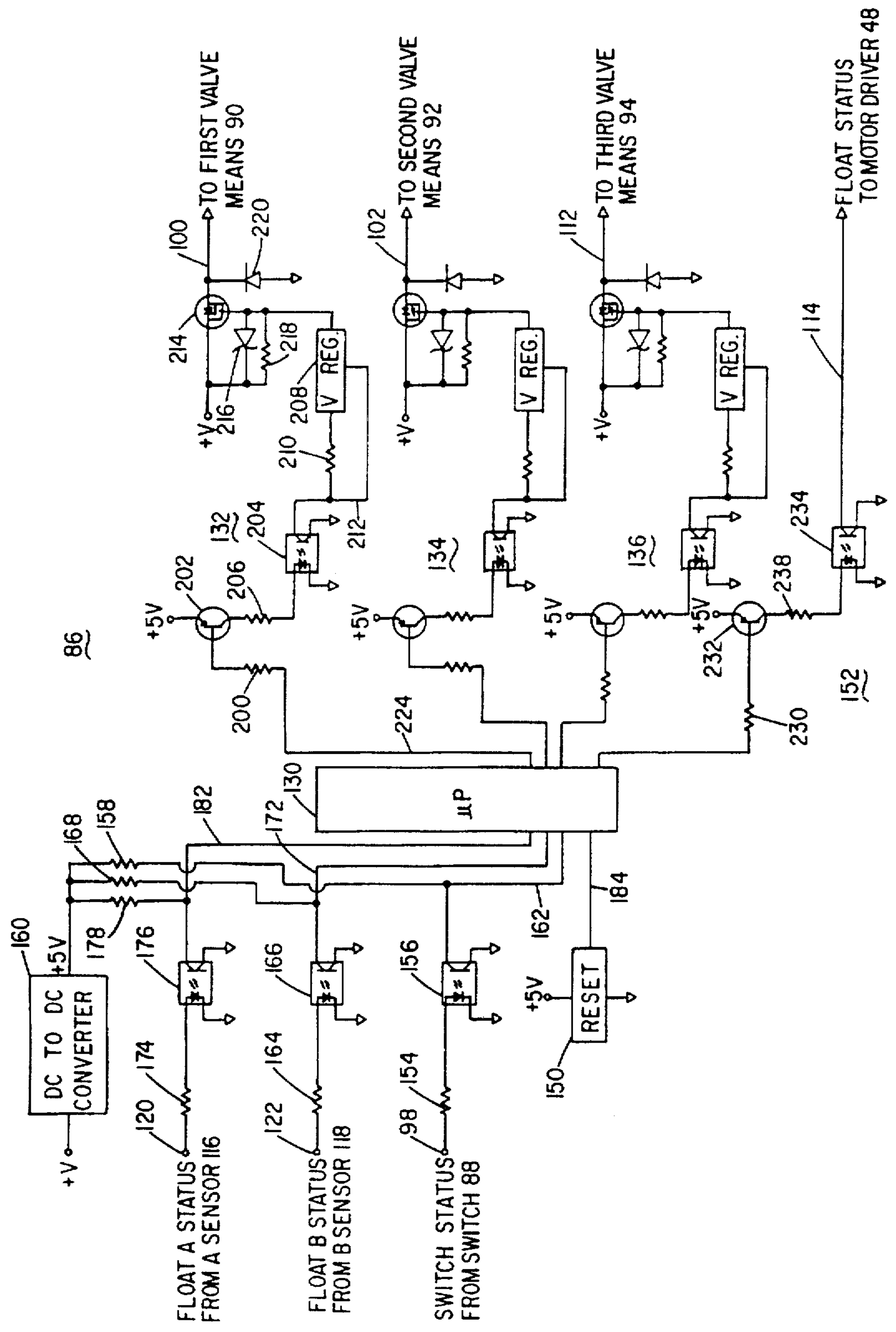
FIG. 3 is a schematic diagram of the dual tank controller 86 of FIG. 1.

Referring now to FIG. 3, illustrated is a schematic diagram of the dual tank controller 86. At the heart of the dual tank controller 86 is the aforementioned microprocessor 130 which may preferably comprise a CMOS 8-bit microprocessor sold by Intel Corporation as its Type 80C51FA. Although not shown, the microprocessor 130 includes a 2K byte ROM for storing an executable program. In general terms, the input side of the microprocessor 130 is configured to receive the status signal from the selector switch 88, the status signal from the first level sensor 116, the status signal from the second level sensor 118, and a reset signal from a watchdog reset module 150. The output side of the microprocessor 130 is connected to the first valve driver 132, the second valve driver 134, the third valve driver 136, and a float status signal driver 152.

With initial regard to the input side of the microprocessor 130, a first coupling circuit for the switch status signal extends between the terminal 98 and the microprocessor 130 and includes a current limiting resistor 154, an optical coupler 156, a pull-up resistor 158, and a switching regulator-type DC-to-DC converter 160 which operates to convert the D.C. voltage produced by the fire-fighting vehicle (+V) to a regulated +5 volt DC signal at its output. The current limiting resistor 154 has a first end connected to the terminal 98 and a second end connected to the anode of the photo-diode portion of the optical coupler 156. The cathode of the photo-diode and the emitter of the photo-transistor are both connected to ground. The collector of the photo-transistor is connected to the +5 volt output of the DC-to-DC converter 160 via the pull-up resistor 158 and to the microprocessor 130 via a conductor 162.

A second coupling circuit is provided for the first low level status signal which extends between the terminal 120 and the microprocessor 130 and includes a current limiting resistor 174 extending between the terminal 120 and an anode of a photo-diode of an optical coupler 176, a pull-up resistor 178 extending between a collector of a photo-transistor of the optical coupler 176 and the +5 v output of the converter 160, and a conductor 182 extending between the collector of the photo-transistor of the optical coupler 176 and the microprocessor 130. In similar fashion, a third coupling circuit for the second low level status signal includes a current limiting resistor 164 extending between the terminal 122 and an anode of a photo-diode of an optical coupler 166, a pull-up resistor 168 extending between a collector of a photo-transistor of the optical coupler 166 and the +5 volt output of the converter 160, and a conductor 172 extending between the collector of the photo-transistor of the optical coupler 166 and the microprocessor 130. The cathode of the photo-diode and the emitter of the photo-transistor within each of the optical couplers 166, 176 are connected to ground.

It can be readily appreciated that the foregoing first, second, and third coupling circuits are all connected to the microprocessor 130 in the same fashion and are identical in construction. With this in mind, the operation of each coupling circuit will be described below with reference only to the first coupling circuit as set forth above. The selector switch 88 is tied to the D.C. voltage provided by the power supply of the fire-fighting vehicle (+V) which may range from +12 volts to +24 volts. The microprocessor 130 is tied to the regulated +5 volt DC signal at the output of the DC-to-DC converter 160. The optical coupler 156 advantageously allows the switch status signal to be transmitted to the microprocessor 130 in spite of the difference in logic levels between the vehicle voltage (+V) and the +5 volt output of the converter 160. The optical coupler 156 turns the photo-diode on and off depending upon the state of the switch status signal such that the photo-transistor turns on when the photo-diode turns on and the photo-transmitter turns off when the photo-diode turns off.

To be more specific, if the switch status signal is in a high state the photo-diode will be forward biased, thereby causing light to be emitted from the photo-diode. This light will cause current to flow from the collector to the emitter of the photo-transistor such that the collector of the photo-transistor is effectively grounded. This effectively maintains the conductor 162 in a low state. Conversely, when the switch status signal is in the low state, no light will be generated by the photo-diode and the emitter of the photo-transistor and conductor 162 will be maintained in a high state at or near the +5 volt regulated voltage from the convertor 160.

The aforementioned discussion of the first coupling circuit for the switch status signal translates exactly to the second coupling circuit for the Float A status signal from the first level sensor 116, in addition to the third coupling circuit for the Float B status signal from the second level sensor 118. As such, when the Float A and Float B status signals are in a high state, the corresponding inputs to the microprocessor 130 will be maintained in a low state via the conductors 182, 172, respectively. Conversely, maintaining the Float A and Float B status signals in a low state will force the corresponding inputs to the microprocessor 130 into a high state via the conductors 182, 172, respectively.

The watchdog/reset module 150 is provided as a safeguard to automatically initialize the microprocessor 130 when the system is first powered up and to automatically re-initialize the microprocessor 130 in the event that the microprocessor 130 malfunctions during operation. In the preferred embodiment, the watchdog/reset module 150 comprises an 8-pin IC chip made by Dallas Semiconductor and sold under the model number DS1232. In the instance that the watchdog/reset module 150 is required to reset the microprocessor 130, the watchdog/reset module 150 sends an initialization signal to the microprocessor 130 via conductor 184 which causes the executable program within the ROM memory to return to location zero to thereby start the program at the beginning.

When the executable program is started or re-started, the microprocessor 130 adheres to the following progression. First, the microprocessor 130 resets the watchdog timer and sets up the timing cycles for operation. The microprocessor 130 then determines which position the toggle switch 96 is in by looking at the switch status signal being input to the microprocessor on conductor 162 and energizes the appropriate valve means corresponding to the status of the switch status signal. The microprocessor 130 next re-examines the status of the tank selector switch 88 and initiates the automatic flushing sequence detailed above. Once the automatic flushing sequence is completed, the microprocessor 130 again detects the state of the switch status signal and directs the appropriate valve means corresponding to the detected state of the selector switch 88 to introduce the appropriate chemical foamant into the manifold 14 shown in FIG. 1. After the introduction of the appropriate chemical foamant is initiated, the microprocessor 130 monitors the switch status signal to detect any change in state. If a change in state is detected, the microprocessor 130 will initiate the automatic flushing feature so as to prepare the foam injection system for the next selected chemical foamant. If a change in switch state is not detected, the selected chemical foamant will be continuously introduced into the water stream until the level within the selected supply tank drops below the predetermined level as indicated by the corresponding low level sensor. As noted above, this causes the microprocessor within the computer and display module 32 to detect the change in the float status signal and generate the "Low Concentrate-A" or "Low Concentrate-B" warning on the display 30 for a predetermined period of time. If additional chemical foamant is not administered into the selected supply tank by the completion of this predetermined period, then the motor driver module 48 will turn off the electric motor 82 so as to stop driving the pump 64.

The output side of the microprocessor 130 will now be described in detail with continued reference to FIG. 3. The first valve driver is indicated generally at 132 and extends between the microprocessor 130 and the conductor 100 for connection to the first valve means 90. The second valve driver is indicated generally at 134 and similarly extends between the microprocessor 130 and the conductor 102 for connection to the second valve means 92. The third valve driver is indicated generally at 136 and extends between the microprocessor 130 and the conductor 112 for connection to the third valve means 94. Lastly, the float status signal driver circuit is indicated generally at 152 and extends between the microprocessor 130 and the conductor 114 for connection to the motor driver 48.

The driving circuit for the first valve driver 132 includes a resistor 200 having a first end connected to the microprocessor 130 and a second end connected to the base of a transistor 202. The emitter of the transistor 202 is tied to the regulated +5 volt supply generated by the DC-to-DC converter 160, while the collector of the transistor 202 is connected to the anode of the photo-diode within an optical coupler 204 via a resistor 206. The collector of the photo-transistor within the optical coupler 204 is connected to the output terminal of a voltage regulator 208 via a resistor and to the adjust terminal of the voltage regulator 208 via a conductor 212. The input terminal of the linear voltage regulator 208 is connected to the gate of a P-channel MOSFET 214. A Zenar diode 216 is provided with its anode connected to the gate of the MOSFET 214 and its cathode connected to the D.C. voltage (+V) generated by the power supply of the fire-fighting vehicle. Also connected to this unregulated voltage supply (+V) is a resistor 218 extending away therefrom for connection to the gate of the MOSFET 214, in addition to the source of the MOSFET 214. Finally, the drain of the MOSFET 214 is connected to the conductor 100, while a clamp diode 220 has its cathode attached to the drain of the MOSFET 214 and its anode attached to ground.

In a normal reset state, all of the output pins of the microprocessor 130 are typically maintained in a high state. In this condition, the microprocessor 130 will be unable to transmit the above-reference driver activation signal to any of the first, second, and third valve drivers 132, 134, 136 such that each of the first, second, and third valve means 90, 92, 94 will initially be off when the microprocessor 130 resets. Thereafter, the microprocessor 130 will determine which chemical foamant has been selected by examining the state of the switch status signal and then output a single driver activation signal to the appropriate one of the first, second, and third valve drivers 132, 134, 136. Stated another way, the driver activation signal is accomplished by dropping the appropriate one of the outputs of the microprocessor from the high state to a low state.

When the microprocessor 130 determines that the chemical foamant disposed within the first supply tank 70 has been selected for introduction into the water being directed at the fire, the microprocessor 130 subsequently directs the driver activation signal to the first valve driver 132 by reducing the output on a first output line 224 from the originally high state to a low state. The low state on the first output line 224 causes the transistor 202 to turn on such that current flows from the anode of the photo-diode within the optical coupler 204 to ground. This current flow through the photo-diode causes light to be emitted from the photo-diode which subsequently turns the photo-transistor on. In other words, the transmission of light energy between the photo-diode and the base of the photo-transistor causes the collector of the photo-transistor to drop to ground. With the collector of the photo-transistor at ground, the output of the voltage regulator 208 is also at ground such that current flows from the truck voltage supply (+V), through the resistor 218, the voltage regulator 208, and the resistor 210 before passing to ground. The linear voltage regulator 208 is configured as a current source such that the regulator 208 will maintain the voltage drop across the resistor 210 at a predetermined level based upon the internal reference of the regulator 208. In a preferred embodiment of the present invention, the linear voltage regulator 208 is a LM317L such that the voltage drop across the resistor 210 is maintained at approximately 1.2 volts due to the internal reference of the regulator 208.

The dual tank controller 86 is self-compensating for variations in line voltage such that the dual tank controller 86 is capable of operating in fire-fighting systems having power supplies that range from +12 volts up to as high as +35 volts. For example, if the dual tank controller 86 of the present invention is employed within a fire-fighting vehicle having a +24 volt power source, a fixed voltage drop of approximately 1.2 volts will be maintained across the resistor 210, a gate-to-source voltage drop of approximately 10 volts will be maintained between the gate and source of the P-channel MOSFET 214, and a voltage drop of approximately 13.8 volts will exist across the voltage regulator 208. When employed within a fire-fighting vehicle having a +12 volt power supply, the voltage drop across the resistor 210 will again be maintained at approximately 1.2 volts, the gate-to-source voltage drop between the gate and the source of the MOSFET 208 will be approximately 8 volts, and the voltage drop across the regulator 208 will be approximately 2 volts. In either event, the first valve driver 132 is capable of generating the valve control signal on line 100 to control the operation of the first valve means 90 to open a line of fluid communication between the first supply tank 70 and the positive displacement pump 64 for introducing the first chemical foamant into the main water stream being directed at the fire.

As noted above, the preferred embodiment of the dual tank controller 86 entails providing the first valve means 90 as a solenoid valve. In this arrangement, then, the first valve means 90 will have a coil disposed therewithin having a first end connected to the conductor 100 and a second end connected to the chassis of the fire-fighting vehicle so as to configure the first valve driver 132 as a high side driver. The advantage of providing the first valve means 132 as a high side driver is that it minimizes the number of wires to required to connect the dual tank controller 86 to the first valve means 90. It will be appreciated that minimizing the number of conductors as such effectively decreases the amount of energy loss as heat dissipation along the wires. The diode 220 is provided between the conductor 100 and ground to clamp the inductive kick from the solenoid coil when the solenoid valve within the first valve means 90 is turned off.

Those skilled in the art will appreciate that the second valve driver 134 and the third valve driver 136 comprise the same driving circuit as found in first valve driver 132. In that a detailed description of the first valve driver 132 has already been set forth above, the construction and operation of the second valve driver 134 and third valve driver 136 is deemed duplicative and will therefore not be repeated. Instead, suffice it to say that both the second and third valve drivers 134, 136 share the same advantages of the first valve driver 132, including the feature of being self-compensating for variations in line voltage such that the dual tank controller 86 may be used in any number of different fire-fighting vehicles having supply voltages ranging from between +12 volts and +35 volts.

The driver circuit for the status signal driver 152 includes a resistor 230 having a first end connected to the microprocessor 130 and a second end connected to the base of a on transistor 232. The emitter of the transistor 232 is connected to the +5 volt output of the DC-to-DC converter 160, while the collector of the transistor 232 is connected to the anode of the photo-diode within an optical coupler 234 via a resistor 238. As will be appreciated, the status signal driver 152 performs in much the same way as the first, second, and third valve drivers 132, 134, 136 in that all of the driving circuits 132, 134, 136, 152 are identically configured up to the pre-drive point which extends between the photo-diode and the photo-transistor of each optical coupler. The only difference with the status signal driver 152 is that the transistor 232 is configured with an open collector output because the switch status signal is transmitted into the microprocessor within the computer and display module 32 after being transmitted to the motor driver module 48 via the conductor 114.

It should be noted with particularity that the dual tank controller 86 is electrically isolated from all inputs and outputs. The dual tank controller 86 is electrically isolated along the input side from the selector switch 88, the first low level sensor 116, and the second low level sensor 118. The dual tank controller 86 is electrically isolated along the output side from the first valve means 90, the second valve means 92, the third valve means 94, and the memory disposed within the computer and display module 32. In so doing, the various status and control signals may be reliably transmitted between the various components notwithstanding the fact that the dual tank controller 86 and the various components may be operating at different logic levels with different ground points.

Figure 4:
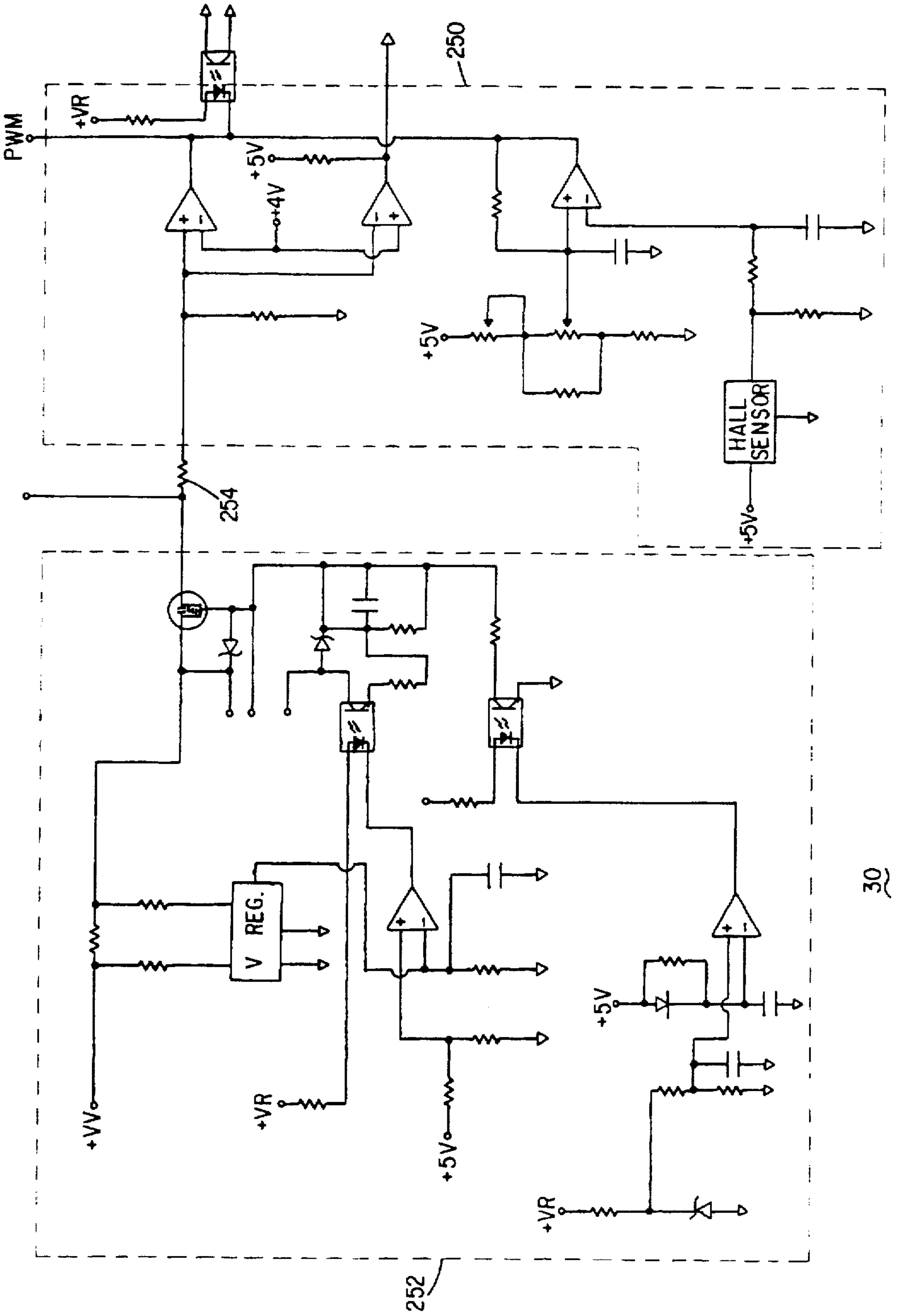
FIG. 4 is a schematic diagram illustrating the electronic fuse circuit 252 and the current limiting circuit 250 of the present invention.

With reference now to FIG. 4, shown is a schematic diagram illustrating a current limiting circuit 250 and an electronic fuse circuit 252 disposed within the motor driver module 48 illustrated in FIG. 1. The current limiting circuit 250 is specifically designed to protect the electronic drive motor 82 by limiting the amount of current that is allowed to flow therethrough such that the motor 82 will not exceed a predetermined threshold current. The electronic fuse circuit 252, on the other hand, is specifically designed to shut off power to the low power devices within the system, such as the computer and display module 32, whenever the current flowing therethrough exceeds a predetermined threshold so that the low power devices are not damaged if an overcurrent condition arises. In that the electronic fuse 252 is connected to the current limiting circuit 250 via a resistor 254, the electronic fuse 252 will also cut off the power to the current limiting circuit 250 when an overcurrent condition exists in the low power electronics such that power will be simultaneously removed from the high power devices, thereby shutting down the entire foam injection system.

Figure 5:
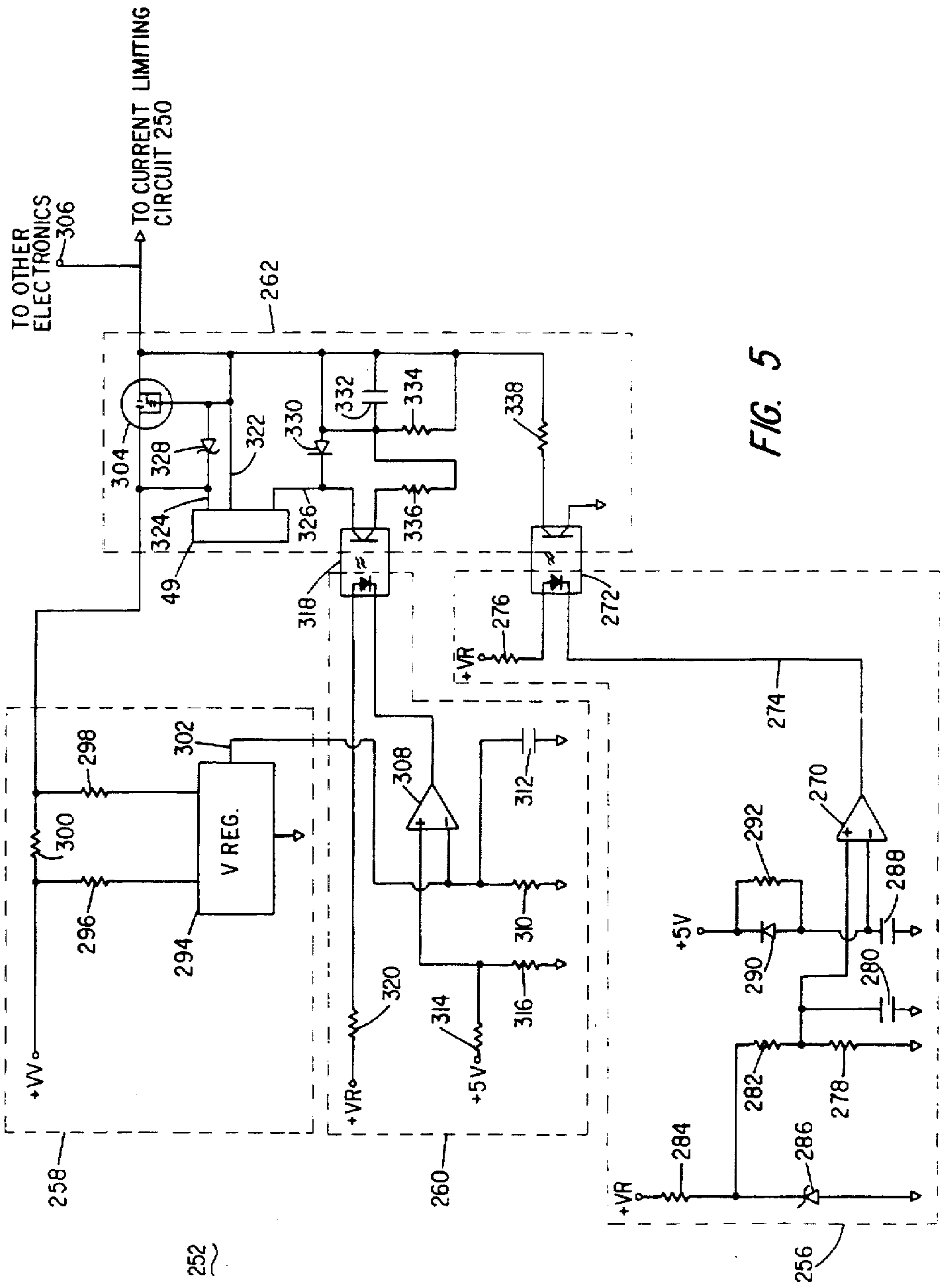
FIG. 5 is a schematic diagram further illustrating the various sub-circuits of the electronic fuse circuit 252 of the present invention.

With collective reference to FIGS. 4 and 5, the electronic fuse circuit 252 includes a delay circuit 256, a current monitor circuit 258, a threshold detection circuit 260, and a tripping circuit 262. The delay circuit 256 is provided to maintain all the high power devices in the off condition until the low power devices, including internal voltage references, are fully powered-up and stabilized. The current monitor circuit 258 serves to continually sense the amount of current being delivered to the low power devices of the system. The threshold detection circuit 260 is provided to set a predetermined current threshold and detect when the output of the current monitor circuit 258 exceeds the threshold to indicate that an overcurrent condition is being experienced somewhere in the low power electronics. The tripping circuit 262 is optically coupled to the threshold detection circuit 260 such that, during an overcurrent condition within the low power electronics, the tripping circuit 262 will immediately cut off the power to the low power devices so as to protect the circuitry therewithin, as well as cut off the power to the current limiting circuit 250 so as to turn off the motor 82.

Figure 6:
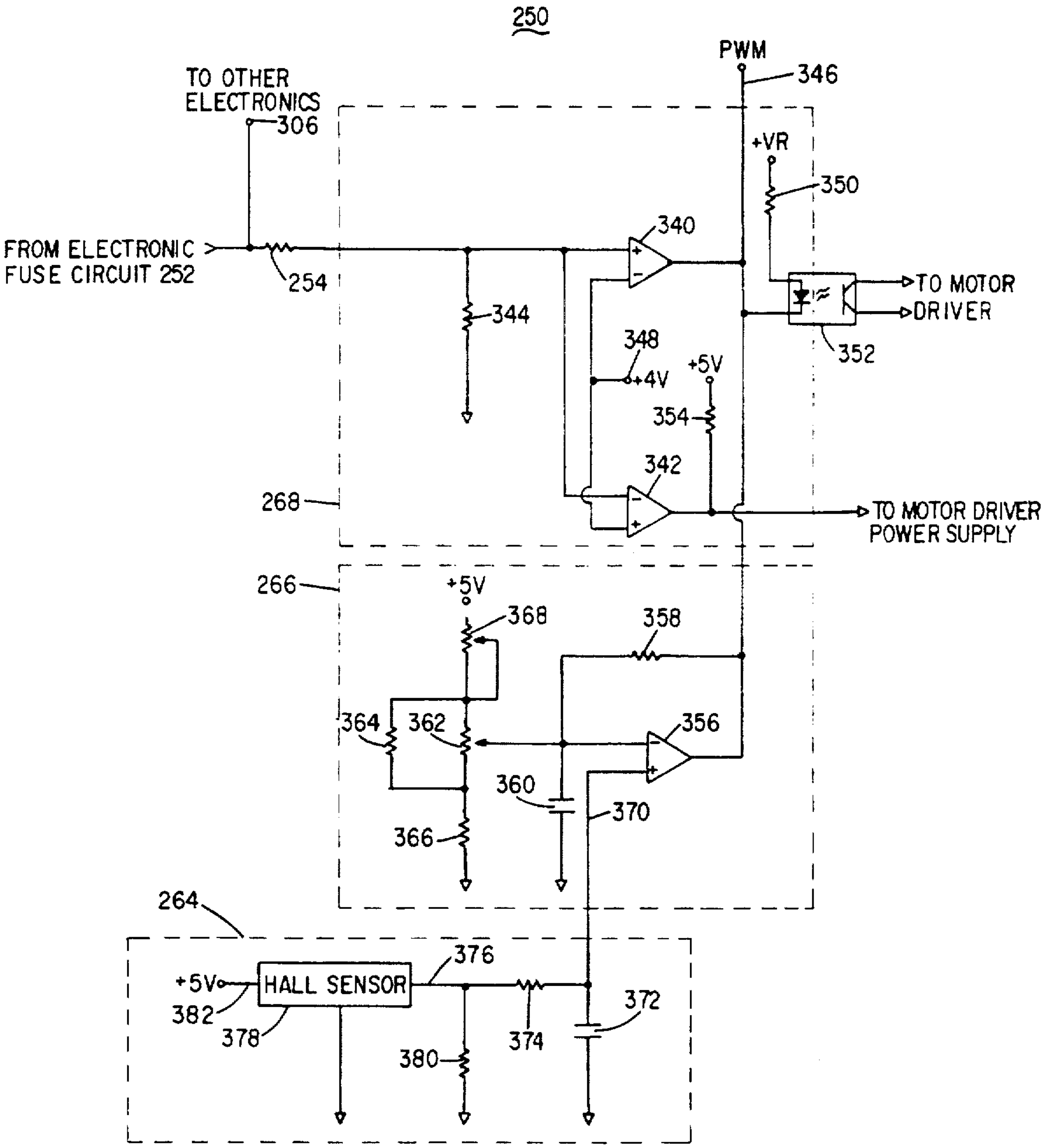
FIG. 6 is a schematic diagram further illustrating the varioius sub-circuits of the current limiting circuit 250 of the present invention.

Referring now to FIGS. 4 and 6, the current limiting circuit 250 is seen to include a current detection circuit 264, an overcurrent detection circuit 266, and a shutdown circuit 268. The current detection circuit 264 is provided to continuously monitor the average current passing into the windings of the motor 82. The overcurrent detection circuit 266 allows an operator to select a predetermined maximum current that will be allowed to pass into the windings of the motor 82 and detects when the average current signal from the current detection circuit 264 exceeds this predetermined current threshold. The shutdown circuit 268 has two main functions. The first function is to turn off a floating power supply connected to the motor drivers within the motor driver module 48 of FIG. 1 when the power being supplied to the current limiting circuit 250 through resistor 254 is cut off by the electronic fuse 252. The second main function of the shutdown circuit 268 is to turn off the power being supplied to the gates of the motor drivers when the overcurrent detection circuit 266 indicates that the average current signal from the current detection circuit 264 has exceeded the predetermined maximum current threshold.

Referring once again to FIGS. 4 and 5, a detailed description of the construction and operation of each sub-circuit within the electronic fuse circuit 252 is as follows. The delay circuit 256 includes an op-amp 270 connected to the cathode of a photo-diode within an optical coupler 272 via a conductor 274. The anode of the photo-diode is connected to an internal voltage reference (+VR) via a resistor 276. The non-inverting input of the op-amp 270 is connected to a resistor 278 and a capacitor 280, both of which are connected to ground, in addition to a resistor 282 which is further connected to a resistor 284 and the cathode of a Zenar diode 286. The anode of the Zenar diode 286 is connected to ground, while the resistor 284 extends from the resistor 282 to the internal voltage reference (+VR). The inverting input of the op-amp 270 is connected to a capacitor 288 which extends to ground, and a diode 290 and a resistor 292 which are both connected to a +5 volt supply.

When the fire-fighting system shown in FIG. 1 is first turned on, it is desirable to restrict the power being supplied to the motor 82 until all of the internal voltage references have had a chance to come up to full power and stabilize. To accomplish this, the delay circuit 256 will cause the voltage level on the conductor 274 to ramp slowly upward until both the internal voltage reference (+CR) and +5 volt supply are fully established. At the point when both internal voltage references are stabilized, the op-amp 270 will cause the voltage signal on the conductor 274 to drop to ground such that current will flow from the voltage reference (+VR), through the resistor 276, and through the photo-diode of the optical coupler 272. The photo-diode will then emit light across to the base of the photo-transistor within the optical coupler 272 so as to effectively forward bias the photo-transistor. As will be described in greater detail below, turning this photo-transistor on in this fashion allows current to flow within the tripping circuit 262 such that power will be supplied to the current limiting circuit 250 via the resistor 254.

The current monitor circuit 258 includes a voltage reference 294 configured as a current sensor through the use of a resistor 296, a resistor 298, and a resistor 300. Under normal operating conditions, current will flow from the voltage reference (+V) through the resistor 300, and through a transistor 304 within the tripping circuit 262 before passing to the low level electronics via terminal 306 and the current limiting circuit 250 via the resistor 254. The resistors 296, 298, 300 are arranged between the voltage reference 294 and the voltage reference (+V) such that the current signal on the output conductor 302 will be proportional to the current flowing through the resistor 300. As such, the output signal on conductor 302 therefor represents the amount of current being delivered to the low power devices via terminal 306 and the current limiting circuit 250 via resistor 254.

The threshold detection circuit 260 includes an op-amp 308 having its inverting terminal connected to the output line 302 from the voltage reference 294 of the delay circuit 258. Also connected to the inverting terminal of the op-amp 308 are a resistor 310 and a capacitor 312, both of which extend to ground. The non-inverting input of the op-amp 308 is connected to the +5 volt supply via a resistor 314 and to ground via a resistor 316. The output of the op-amp 308 is connected to the cathode of a photo-diode disposed within an optical coupler 318. The anode of this photo-diode is connected to the internal voltage reference (+VR) via a resistor 320.

To ensure that the low power electronics are not subjected to damagingly high currents, it is desirable to set the predetermined maximum current threshold at approximately 3 amps. To accomplish this, the resistors 314 and 316 are chosen such that the voltage drop across the resistor 316 matches the voltage drop across the resistor 310 when the current flowing within the resistor 300 of the current monitor circuit 258. Under normal operating conditions the current flowing within the resistor 300 will be less than the predetermined maximum threshold of 3 amps such that the voltage drop across the resistor 310 will be less than the voltage drop across output of the resistor 316. During this condition, the output of the op-amp 308 remains in a high logic state such that no current is permitted to flow through the photo-diode within the optical coupler 318. In the instance that the current flowing through the resistor 300 exceeds the 3 amp maximum, the voltage drop across the resistor 310 will be greater than the voltage drop across the resistor 316 such that the output of the op-amp 308 will drop to ground. By dropping the output of the op-amp 308 to ground, current is permitted to flow from the voltage reference (+VR), through the resistor 320, and through the photo-diode of the optical coupler 318 before passing to ground. This effectively forward biases the photo-transistor of the optical coupler 318 which, as will be described immediately below, serves to turn off the transistor 304 of the tripping circuit 262 so as to cut off the power being supplied to the low power electronics via the terminal 306 and the current limiting circuit 250 via resistor 254.

The tripping circuit 262 is seen to include the double pole-double throw toggle switch 49 shown generally in FIG. 1 having an OFF/RESET terminal 322, a common terminal 324, and an ON terminal 326. The common terminal 324 is connected to the source of the transistor 304 and to the cathode of a Zenar diode 328 which extends to the gate of the transistor 304. The OFF/RESET terminal 322 is also connected to the gate of the transistor 304, as well as the cathode of a silicon-controlled rectifier (SCR) 330. The anode of the SCR 330 is connected to the ON terminal 326, while gate of the SCR 330 is connected to the first end of a capacitor 332. The opposite end of the capacitor 322 is connected to the cathode of the SCR 330, in addition to the first end of a resistor 334 which is further connected at its second end to the gate of the SCR 330. The gate of the SCR 330 is also connected to a resistor 336 which extends to the emitter of the photo-transistor of the optical coupler 318. The collector of this photo-transistor is connected the ON terminal 326 of the switch 49. A resistor 338 has a first end connected to the first end of the resistor 334 and a second end connected to the collector of the photo-transistor within the optical coupler 272.

Under normal operating conditions, the toggle member 51 shown in FIG. 1 will be in the ON position shown at 51*a*. Although not illustrated explicitly in FIG. 5, placing the toggle member 51 in this ON position effectively connects the common terminal 324 and the ON terminal 326 within the switch 49. Arranged as such, the transistor 304 will be turned on such that current will flow into the source and out the drain of the transistor 304, as well as in a current path which leads from the common terminal 324, through the Zenar diode 328 and further through the resistor 338 before passing from the collector to emitter of the forward biased photo-transistor of the optical coupler 272. Once again, this photo-transistor within the optical coupler 272 is forward biased due to the fact that the output from the op-amp 270 of the delay circuit 256 is held low after the system has been allowed sufficient time to stabilize after the initial power up or system reset.

When an overcurrent condition is detected by the threshold detection circuit 260, the output of the op-amp 308 will drop to ground such that current will flow through the photo-diode of the optical coupler 318 so as to forward bias the photo-transistor of the optical coupler 318 with light energy. This effectively redirects a flow of current from the gate of the transistor 304, through the switch 49, through the photo-transistor of the optical coupler 318, through the resistors 336, 334, and 338, and finally through the photo-transistor of the optical coupler 272 to ground. This newly developed current flow causes a charge to accrue within the capacitor 332 which, in turn, causes the SCR 330 to turn on. When the SCR 330 fires in this fashion, the Zenar diode 328 is turned on such that the transistor 304 turns off, thereby stopping the current flow to the terminal 306 and resistor 254. As indicated above, this effectively shuts down the current limiting circuit 250 such that power is immediately removed from both the floating power supply powering the motor drivers within the motor driver module 48, in addition to the gates of the motor drivers.

A characteristic of the SCR 330 is that, in order to be turned off, all the power being supplied thereto must be removed. To accomplish this, the toggle switch 51 of FIG. 1 must be toggled from the position at 51*a* to the position at 51*b* to create a connection between the common terminal 324 and the OFF/RESET terminal 322 of the switch 49 so as to short out the Zenar diode 328. With this short established across the Zenar diode 328, the circuit extending from the ON terminal 326 to the optical coupler 318 is opened such that the SCR 330 is deenergized. Once the SCR 330 has been deenergized, the toggle member 51 must be returned to the position at 51*a* in order to once again power up the system. As discussed above, the delay circuit 256 is employed each time the system is powered up to allow the internal voltage references and other electronics to power up and stabilize before permitting current to flow through the electronic fuse circuit 252 to the power the low level electronics via terminal 306 and the current limiting circuit 250 via resistor 254.

With collective reference to FIGS. 4 and 6, the construction of the various sub-circuits within the current limiting circuit 250 is as follows. The shutdown circuit 268 includes an op-amp 340 and an op-amp 342. The non-inverting input of the op-amp 340 is connected to the inverting input of the op-amp 342. The inverting input of the op-amp 340 is connected to the non-inverting input of the op-amp 342, and a line 348 extends therefrom for connection to a +4 volt power supply. The non-inverting input of the op-amp 340 is also connected to the resistor 254 and a resistor 344 which extends to ground. The output line of the op-amp 340 is connected to a line 346 which carries the pulse width modulated (PWM) signal generated by the computer and display module 32 shown in FIG. 1. A resistor 350 extends between the voltage reference (+VR) and the anode of a photo-diode within an optical coupler 352. The cathode of this photo-diode extends away from the optical coupler 352 for connection to the PWM line 342. The output line of the op-amp 342 is connected to a resistor 354 which extends to the +5 volt power supply and extends further for connection with the floating power supply which supplies power to the motor drivers disposed within the motor driver module 48 of FIG. 1. The PWM line 342 extends further from the shutdown circuit 268 for connection to the output terminal of an op-amp 356 of the overcurrent detection circuit 266.

In addition to the op-amp 356, the overcurrent detection circuit 266 also includes a resistor 358 extending from the PWM line 342 to the non-inverting input of the op-amp 356. The non-inverting input of the op-amp 356 is further connected to a capacitor 360 which extends to ground and the wiper arm of a potentiometer 362. A resistor 364 is arranged in parallel with the potentiometer 362. A resistor 366 extends from one end of the resistor 364 to ground, while the wiper arm of a potentiometer 368 is connected to the opposite end of resistor 364. The +5 volt supply is connected to the upper end of the potentiometer 368. The inverting input of the op-amp 356 extends to the current detection circuit 264 via a line 370.

The current detection circuit 264 includes a capacitor 372 having a first end connected to the line 370 extending from the overcurrent detection circuit 266 and a second end connected to ground. A resistor 374 extends from the first end of the capacitor 372 for connection to an output line 376 of a Hall-effect sensor 378. A resistor 380 is further provided extending between the output line 376 and ground. The Hall-effect sensor 378 has an input line 382 connected to the +5 volt power supply. Although not shown, the Hall-effect sensor is configured so as to envelop approximately half of wires which are connected to the coils of the motor 82 such that the average current flowing within the motor 82 may be readily and accurately determined during the operation of the motor 82.

Having described the construction of the current limiting circuit 250, the operation is as follows. At start-up, power is initially withheld from the current limiting circuit 250 by virtue of the delay circuit 256 of the electronic fuse circuit 252. During this off period, the voltage drop across resistor 344 is approximately zero because the transistor 304 of the electronic fuse circuit 252 is maintained in the off condition. The +4 volt reference tied to the terminal 348 is higher in potential than the voltage drop across the resistor 344 such that the output of op-amp 340 is maintained at ground. With the output of the op-amp 340 held at ground potential, current flows from the voltage reference (+VR), through the resistor 350, and through the photo-diode of the optical coupler 352 to thereby turn the accompanying photo-transistor on. When the photo-transistor of the optical coupler 352 is forward biased in this manner, no current is transmitted to the power transistors within the motor driver module 48 such that the motor 82 is maintained in the off state. The PWM signal on line 348 cannot alter the status of the optical coupler 352 during this start up period because microprocessor within the computer and display module 32 undergoes a 2 second start-up sequence wherein the PWM signal is not generated.

Once the delay circuit 256 of the electronic fuse circuit 252 has run its course, the transistor 304 within the triggering circuit 262 is thereafter permitted to turn on such that the voltage drop across the resistor 344 of the shutdown circuit 268 quickly surpasses the +4 volt reference on terminal 348. Once this occurs, the output of the op-amp 340 is forced into a high state such that the photo-transistor within the optical coupler 352 is turned off, having an open collector output. In this condition, the optical coupler 352 may then be pulled high or low with the PWM signal on line 346. The PWM signal on line 346 is normally low and pulses high. Therefore, when the PWM signal pulses high, the phototransistor within the optical coupler 352 is turned off, thereby allowing current to be supplied to the gates of the power transistors of the motor drivers which drive the motor 82. Conversely, the photo-transistor within the optical coupler 352 will be turned on when the PWM signal on line 346 is low so as to prevent current from flowing to the power transistors of the motor driving circuitry.

In order to prevent any overcurrent conditions within the motor 82, the potentiometers 362 and 368 are used to set a voltage reference at the non-inverting input of the op-amp 356 which corresponds to the maximum current that is to be permitted to flow within the motor 82. In a preferred embodiment, the motor 82 is a ¾ horse electric drive motor which draws approximately 54 amps at full speed. As such, the voltage reference at the non-inverting terminal of the op-amp 356 should preferably be set so as to represent a current level slightly above the 54 amp rating, such as at 60 amps. Arranged in this fashion, the op-amp 356 will compare the voltage levels at the non-inverting and inverting input to determine whether an overcurrent condition exists within the motor. When the voltage level at the inverting input is lower than the voltage level at the non-inverting input, the output of the op-amp 356 will remain high such that the PWM signal on line 346 may turn the optical coupler 352 on and off as needed. Conversely, when the voltage level at the inverting input of the op-amp 356 exceeds the voltage level at the non-inverting input, the output of the op-amp 356 will drop to ground such that the optical coupler 352 is maintained in the on condition, thereby prohibiting current from flowing to the motor driver.

After the threshold has been set to establish the predetermined maximum average current that may pass into the motor 82, the average current sensed within the motor via the current detection circuit 264 dictates whether the shutdown circuit 268 will cut off the current being supplied to the motor driver. The average current flowing within the motor 82 is determined by routing a portion of the wires which run into the windings of the motor 82 in near proximity to the Hall-effect sensor 378. By doing so, the Hall-effect sensor 378 is capable of detecting the amount of magnetic flux emanating from these routed wires and generating an output signal on line 376 which is directly proportional to this simultaneous flux measurement. The actual averaging of the output 376 of the Hall-effect sensor 378 is performed by the capacitor 372.

In a preferred embodiment, the total number of conductor wires running into the windings of the motor 82 are physically separated into two portions such that each portion contains an equal number of conductors. One of the portions is routed near the Hall-effect sensor 378 so as to detect the total amount of current flowing within the motor 82 which is thereafter averaged by the capacitor 372. In this fashion, the current sensing range of the Hall-effect sensor 378 is effectively doubled in that, by splitting the wires which supply current to the motor in half, the amount of current sensed within the motor 82 is half of the actual current that is flowing within the motor 82 at any given time.

In the instance that an overcurrent condition is experienced within the low power electronics such that the electronic fuse circuit 252 cuts off power to the current limiting circuit 250, the shutdown circuit 250 effectively cuts of the power being supplied to the motor drivers of the motor driver module 48. In addition to this function, the shutdown circuit 268 also serves to cut off the power being supplied to the power supply which feeds the motor drivers within the motor driver module 48. The shutdown circuit 268 accomplishes this by having the output of the op-amp 342 remain in the high state during normal operation. In the instance that the current is not permitted to flow from the electronic fuse circuit 252, the voltage level at the inverting input of the op-amp 242 eventually drops below the voltage level (+4 volt) at the noninverting input of the op-amp 342 such that the output terminal of the op-amp 342 drops to ground. In this case, the floating power supply which powers the motor driver is immediately forced to ground potential so that all the energy that was in the motor driver at the time the electronic fuse 252 tripped is allowed to dissipate from the system. This eliminates the tendency for this energy to flow through the power transistors of the motor driver after the electronic fuse 252 is tripped, which could possibly turn the power transistors on and damage the system.

Figure 7A:
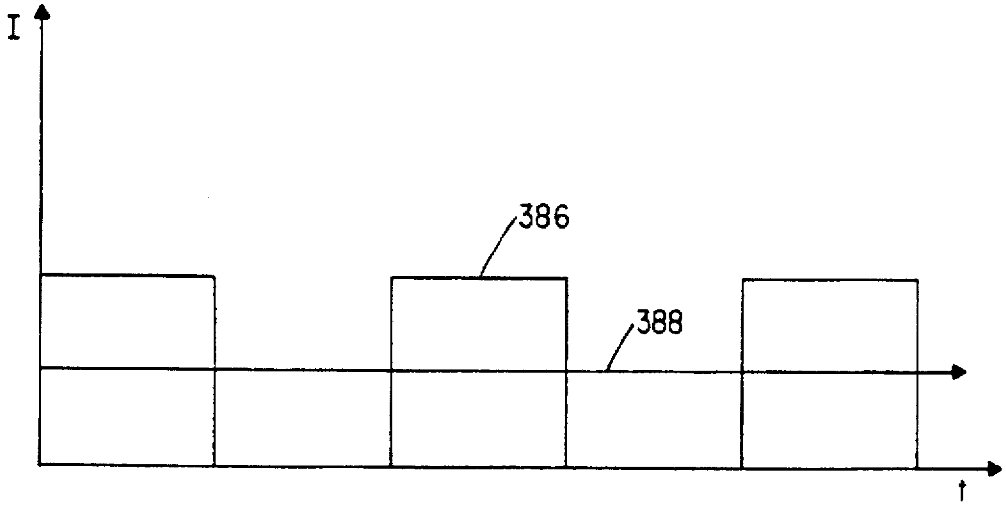
FIG. 7A is a waveform diagram representing the actual and average current flowing through the motor 82 while under normal operating conditions.
Figure 7B:
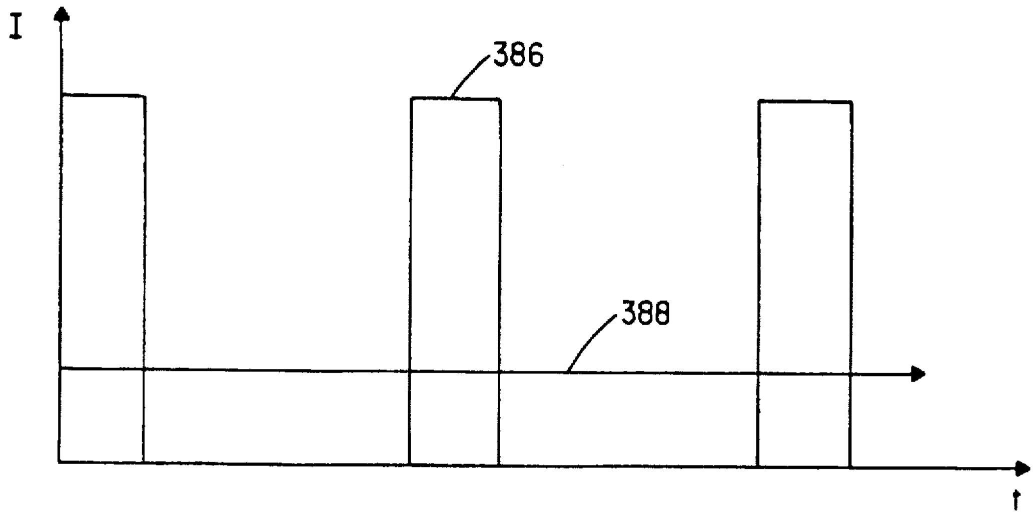
FIG. 7B is a waveform diagram representing the actual and average current flowing through the motor 82 while experiencing an overcurrent condition.

With collective reference now to FIGS. 7A and 7B, shown is a first waveform 386 representing the total current flowing within the motor 82 with a superimposed second waveform 388 representing the average current flowing within the motor 82. Stated another way, the first waveform 386 represents the signal which is output from the Hall-effect sensor 378 on line 376, while the second waveform 388 is the signal which is output from the current detection circuit 264 on line 370. FIG. 7A represents a condition where the motor 82 is being operated with a 50% duty cycle under a normal current load. Each current pulse is on for 50% of the total cycle and off for the remaining 50% of the total cycle. The total current 386 flowing within the motor 82 pulses from a low level of approximately 0 amps to a peak current level of approximately 120 amps such that the average current 388 flowing within the motor 82 remains constant at approximately 60 amps. FIG. 7B represents the response of the current limiting circuit 250 when an overcurrent condition is experienced within the motor 82. Once the average current flowing within the motor 82 exceeds the predetermined maximum average current established by the overcurrent detection circuit 266, the shutdown circuit 268 cuts off the current flowing into the motor driver until such time that the average current within the motor 82 falls below the predetermined maximum average current threshold. In this instance, each current pulse is on for 25% of the total cycle and off for the remaining 75% of the total cycle. The total current 386 flowing within the motor 82 pulses from a low level of approximately 0 amps to a peak current level of approximately 240 amps such that the average current 388 flowing within the motor 82 remains constant at approximately 60 amps. In so doing, the current limiting circuit 250 adjusts the duty cycle of the current flowing within the motor 82 so that the average current being delivered to the motor 82 never exceeds the predetermined maximum average current threshold.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. In a fire extinguishing system of the type including water supply means for normally delivering water at varying flow rates through a hose member, means for monitoring water flow through said hose member and producing an electrical signal related to a characteristic of the water flowing through said hose member, a supply tank for containing a supply of a liquid chemical foamant, pump means having an input port coupled to said supply tank and an output port coupled to said hose member, sensing means for sensing a parameter corresponding to one of a speed at which said pump means is being driven and a flow of liquid chemical foamant being pumped from said pump means and generating a corresponding output signal, computing means coupled to receive said electrical signal and said output signal from said sensing means, said computing means for determining a speed at which a variable speed electrical drive motor connected to said pump means should be driven to introduce a metered quantity of said liquid chemical foamant into said hose member and for generating a corresponding control signal, the improvement comprising:

current limiting means coupled to said computing means and said drive motor, said current limiting means for setting an average current threshold indicative of a maximum average current that can flow within said drive motor, detecting when an average current flow within said drive motor exceeds said average current threshold, and automatically removing a motor supply current being supplied to said drive motor when said average current exceeds said threshold for a time such that said average current is maintained at said threshold.

2. The fire extinguishing system as set forth in claim 1 and further, said current limiting means including current detection means for detecting said average current flowing within said driver motor, over current detection means for setting said average current threshold and detecting when said average current flow within said drive motor exceeds said average current threshold, and shutdown means for automatically removing said motor supply current from said drive motor when said average current flow within said drive motor exceeds said average current threshold for a time such that said average current flow within said drive motor is maintained at said average current threshold.

3. The fire extinguishing system as set forth in claim 2 and further, said shutdown means including means for automatically removing said motor supply current from said drive motor when an overcurrent condition occurs within said computing means.

4. The fire extinguishing system as set forth in claim 2 and further, said current detection means including magnetic flux detection means for detecting an amount of magnetic flux within a set of wires which supply said motor supply current to said drive motor and calculating said average current flow based on said amount of magnetic flux.

5. The fire extinguishing system as set forth in claim 1 and further, including electronic fuse means coupled to said current limiting means and said computing means, said electronic fuse means for setting a current threshold indicative of a maximum current that can flow within said computing means, for detecting when a current flow being applied to said computing means exceeds said current threshold, and automatically removing said current flow from said computing means when said current flow exceeds said current threshold.

6. The fire extiguishing system as set forth in claim 5 and further, said electronic fuse means including current monitor means for sensing said current flow being applied to said computing means, theshold detection means for setting said current threshold indicative of said maximum current that can flow within said computing means and for detecting when said current flow being applied to said computing means exceeds said current threshold, and tripping means for automatically removing said current flow being applied to said computing means when said current flow exceeds said current threshold.

7. The fire extinguishing system as set forth in claim 6 and further, said electronic fuse means further including delay means for delaying witholding said current flow being supplied to said computing means and said average current flow within said drive motor until a predetermined period of time has been allowed to elapse.

8. A method of protecting the circuitry within a foaminjection fire fighting system, said circuitry including low power devices and high power devices, comprising the steps of:

(a) automatically limiting an average current flow within said high power devices so that said average current flow does not exceed a predetermined average current threshold and is maintained at said threshold; and (b) automatically limiting a current flow within said low power devices so that said current flow does not exceed a predetermined current threshold.

9. The method as set forth in claim 8 and further, said step (a) including the further sub-steps of:

(i) setting said average current threshold indicative of a maximum average current that can flow within said motor;

(ii) detecting when said average current flow within said drive motor exceeds said average current threshold; and (c) automatically removing a motor supply current being supplied to said drive motor when said average current exceeds said threshold for a time such that said average current is maintained at said threshold.

* * * * *